United States Patent [19]

Reime

[11] Patent Number: 5,479,216
[45] Date of Patent: Dec. 26, 1995

[54] SYSTEM FOR TRANSMITTING COLOR TELEVISION SIGNALS THAT CONTAIN A LUMINANCE SIGNAL AND AT LEAST ONE COLOR SIGNAL RELATED THERETO

[75] Inventor: Gerd Reime, Schömberg, Germany

[73] Assignee: Nokia Technology GmbH, Pforzheim, Germany

[21] Appl. No.: 57,310

[22] Filed: May 5, 1993

[30] Foreign Application Priority Data

May 6, 1992 [DE] Germany ............... 42 15 007.8

[51] Int. Cl.⁶ .................... H04N 9/68; H04N 9/64
[52] U.S. Cl. .................................. 348/631; 348/625
[58] Field of Search ........................ 348/625, 627,
348/628, 629, 630, 631; H04N 9/68, 9/77,
5/208, 5/205, 5/20, 9/64

[56] References Cited

U.S. PATENT DOCUMENTS

| Re. 34,176 | 2/1993 | Skinner et al. |
| 4,739,395 | 4/1988 | Johanndeiter et al. |
| 4,758,891 | 7/1988 | Hitchcock et al. |
| 4,980,755 | 12/1990 | Ozaki |
| 5,053,865 | 10/1991 | Ubukata |
| 5,159,442 | 10/1992 | Mizuta |

FOREIGN PATENT DOCUMENTS

| 0302500 | 2/1989 | European Pat. Off. |
| 0340648 | 11/1989 | European Pat. Off. |
| 0421369 | 4/1991 | European Pat. Off. |
| 3541103 | 12/1986 | Germany |

OTHER PUBLICATIONS

"TDA4670 Picture Signal Improvement (PSI) circuit" by Peter Kelting, Electronic Components &–Applications, vol. 10, No. 1, pp. 37–47.

Primary Examiner—David E. Harvey
Attorney, Agent, or Firm—Ware, Fressola, Van Der Sluys & Adolphson

[57] ABSTRACT

Inserted in the transmission path (10) for transmitting a color signal of a color television signal is a signal switcher (12) with at least three switch positions (12a, 12b, 12c), the end positions of which are connected to the output (11.2) and input (11.1), respectively, of a delay line (11) contained in the transmission path. Connected to the transmission path (8) of the luminance signals is an edge detection arrangement (24) which, when a signal edge is detected in the luminance signal, generates a detection signal that oscillates about a zero line and has a zero crossing at the detection time, and controls the signal switcher in such a way that an associated color signal edge of the color signal, which has a steep slope and occurs at the point in time of the signal edge of the luminance signal, is transmitted. In the absence of detection of a signal edge, portions of both the undelayed and the delayed color signal are transmitted to the signal output (12.3) of the signal switcher.

20 Claims, 8 Drawing Sheets

SYSTEM FOR TRANSMITTING COLOR TELEVISION SIGNALS THAT CONTAIN A LUMINANCE SIGNAL AND AT LEAST ONE COLOR SIGNAL RELATED THERETO

TECHNICAL FIELD

The invention concerns an arrangement for transmitting color television signals that contain a luminance signal and at least one color signal related thereto.

BACKGROUND OF THE INVENTION

In the transmission of color television images, the color information of a color television image is generally transmitted separately from the luminance information, especially in order to preserve the black-and-white transmission compatibility of such a television image. The frequency bandwidth available for transmission of the color signals for such color information is considerably less than for transmission of the associated luminance signals. Moreover, during the transmission of color television images the color signal changes its transmission mode more often than the associated luminance signal. As a result, within a transmission of a color television image, the color signal is more often exposed to interference loci within the transmission path than is the luminance signal. In addition, these interference loci flatten out discontinuous changes, in particular in the transmitted color information in the transmission path, because of the much smaller transmission bandwidth, considerably more than the corresponding luminance discontinuities are flattened in the transmission path of the luminance signal. The flattening of originally discontinuous color transitions with a large difference in chroma causes, especially at a vertical color boundary of the original image, a disturbed color transition, which occurs in the form of a relatively broad, disturbing colored fringe, the color of which lies between the chroma of the two color areas contiguous to one another at the discontinuous boundary. Moreover, this disturbing color fringe is usually located to one side of the original discontinuous color boundary, so that a distorted color image, often located clearly to one side of the luminance contours, is reproduced.

Technical Bulletin TI 891023 of the Philips company, entitled "The TDA 4670 circuit for image signal reprocessing in television receivers," discloses a circuit for eliminating the aforesaid spurious colors in the color fringe of a vertical color boundary; this circuit contains, in the color difference transmission channels of a color television, differentiating edge detectors of an edge detector arrangement. Each edge detector generates at its output a detector signal, which depends on the type of signal edge detected, that is differentiated again in a downstream pulse shaper of the arrangement, and then conveyed to a switching circuit with a set switching threshold. The switching signals of the edge detector arrangement generated in this manner control an analog switch in the transmission line, at the output side of which is connected a storage capacitor. The analog switch is interrupted for the duration of the switching signal of the edge detector arrangement, so that while the analog switch is in the interrupted state, the storage capacitor determines the level of the output-side transmission signal, and keeps the transmission signal for that period at the level most recently applied before the analog switch opened. After the analog switch closes again, i.e. after the end of the signal edge, the signal on the output-side transmission line changes, with the relatively short charging time of the storage capacitor, to the level of the signal state after the signal edge, so that the slope of the corrected signal edge depends only on the short charging time of the storage capacitor. It has been found, however, that in many cases, especially when a video recorder is connected to the television, the disturbing spurious color fringes at vertical color boundaries are not eliminated, and furthermore a disturbed, weak color image is reproduced on the color television screen.

Unpublished German patent application P4132508.7 proposes a transmission arrangement for transmitting color television signals for reproducing a color television image on a screen, in which a delay line is arranged both in the transmission path of the luminance signal and in the transmission path of the associated color signal of the color television signals. The transmission path of the color signals also contains a signal switcher whose signal output is connected in one switch position of the signal switcher to the output of the delay line, and in the other switch position of the signal switcher to the input of the delay line. The signal switcher is controlled both by a color boundary detector detecting the color signal, and by a luminance discontinuity detector detecting the luminance signal. If no color discontinuity or luminance discontinuity is detected, the CSCC output signal is formed from the delayed color signal and the delayed luminance signal. During detection of a discontinuity in color or luminance, the signal output of the signal switcher is switched, during transmission of the delayed color discontinuity, to the input of the delay circuit in the transmission path of the color signal, at which the new color signal is already present behind the color discontinuity.

Although the spurious color band at a vertical color boundary is largely eliminated by the features just described, the color edge nevertheless still exhibits a disturbing jitter, which makes the color boundary unpleasantly unstable. This disturbance is especially pronounced with fairly noisy color television signals, or when the color television signal of one chroma changes, over a relatively flat signal edge, into another chroma, and the slope of the signal edge of the depicted color boundary fluctuates from line to line. The shape and amplitude of the detection signals that are generated in the processing circuits of the edge detectors depend on the nature of the detected signal edges, so that they result in very different detection times in terms of the beginning of the switching edge. This leads to a flickering color boundary that is perceived as disturbing. This procedure is depicted schematically in diagrams (a) to (d) of FIG. 1. Depicted schematically in diagram (a) are the signal edges 1.1, 1.2, and 1.3 of three transmitted color signals 2.1, 2.2, and 2.3, each of which rises, within an edge duration Tf, from a level P1.1, P1.2, P1.3 representing a color F1, to a level P2.1, P2.2, P2.3 representing a color F2. Diagram (b) schematically depicts the three associated bell-shaped detection signals 3.1, 3.2 and 3.3 of an edge detector (not described further). Also drawn in diagram (b) is the reference level Ps at which the portion of a detector signal that exceeds this reference level generates, at the output of a threshold value switch of this detector arrangement, a switching signal depicted in diagram (c). In the exemplary embodiment depicted, the portion 4.3 of the detector signal 3.3 that exceeds the reference level Ps generates the switching signal 6.3. Since the three detection signals 3.1, 3.2, and 3.3 themselves have very different amplitudes and edge slopes, they pass through the reference level Ps of the detector arrangement at very different times t1, t2, or t3, although they begin at the same starting time t0. These aforesaid different times, however, define the switching edges 5.1, 5.2, and 5.3 for the detection time of the detected signal edges. Diagram (d) schematically depicts five video lines z1 to z5 of a video image, with a vertical color boundary K between the two areas with color F1, to the left of the color boundary, and F2, to the right of the color boundary K. The continually changing jitter resulting from the different switching edges 5.1, 5.2, and 5.3 is clearly evident in diagram (d).

SUMMARY OF THE INVENTION

The underlying object of the invention is to design an arrangement, as indicated in the preamble, for transmitting color television signals that contain a luminance signal and at least one color signal related to it, in such a way that no disturbing spurious color fringes and no disturbing color boundary jitters occur, especially at the vertical color boundaries. In accordance with the invention, this object is achieved by a system for transmitting color television signals that contain a luminance signal (Ya) and at least one color signal (FSf), the system having a delay line, a signal switcher, and an edge detector arrangement detecting the signal edges (Ya3) of the luminance signal (Ya) and contains two delay lines connected in series, of which the input of the first delay line is connected to the input of the transmission path of the luminance signal and of which the delay time (Tv27) of at least the first delay line is greater than the longest edge duration (T(SF3)) of a color signal edge (FSf3) causing a disturbing color fringe, connected to the input and the output of the first delay line are in each case one input of the two first difference inputs, and connected to the input and the output of the second delay line are in each case one input of the two second difference inputs of a signal processing circuit associated with the edge detector arrangement, to form a first signal difference signal corresponding to the difference (Ya-Tb) between the signal values of the signals (Ya, Yb) applied to the two first difference inputs, and a second signal difference signal corresponding to the difference (Yb, Yc) between the signal values of the signals (Yb, Yc) applied to the two second difference inputs and to generate, at a detection output for controlling the switchover of the signal switcher, an edge difference signal that is formed from the difference between the first and second signal difference signals, oscillates about a zero line, and exhibits a zero crossing at the detection point (t2) of the detected signal edge (Yb3) of the delayed luminance signal (Yb), the signal switcher contains a third switch position which is connected via ohmic resistors connected to the output of the delay line arranged in the transmission path of the color signal, and is connected to the second switch position which is connected to the input of the delay line, and to which the signal switcher is set as long as no edge difference signal is present; and that during the oscillation of the edge difference signal located before the zero crossing of the edge difference signal, the output of the delay line, and during the oscillation of the edge difference signal after the zero crossing, the input of the delay line, is connected to the signal output of the signal switcher.

With the means of the invention, on the one hand, two identically shaped, offset, but still overlapping detection signals are generated, in a simple manner, at the edge of the delayed signal that is to be detected. Subtraction of the two overlapping detection signals in a subtraction arrangement, or addition of the two overlapping difference signals, inverted with respect to one another, in an addition arrangement, produces an edge difference signal that oscillates in a defined manner about a zero line and contains, in the overlap region of the two individual signals at the center of the edge difference signal, a zero crossing at the steepest point of the signal. The location of the zero crossing is largely independent of the shape and amplitude of the individual signals that occur during detection.

Outside a color boundary, on the other hand, superimposition of the delayed and undelayed color signals does not, as might be expected, result in a flattened image upon reproduction, but on the contrary produces a lower-noise image with substantially fewer disturbed color areas. There are fewer image disturbances at the color boundaries because there are fewer switchover disturbances in the signal switcher, since because the signal switcher is in the center position during normal operation, outside the color boundary the distance between the two signal states before and after the transition edge is less, at least when switching out of and into the rest state, than with the prior art.

In a particularly advantageous embodiment of the invention, the switchover device of the signal switcher is an electronic crossfade potentiometer that can be controlled, directly or by means of a setting signal amplifier, by the edge difference signal generated by the edge detector arrangement. Firstly, this eliminates any control of the signal switcher by means of switching procedures, which are always associated with switching disturbances on the transmission path of the switched signals. Secondly, the equalization procedure used to suppress the spurious color fringe can easily be adapted to the type of transition at the signal edge from one signal state to the other signal state, so that with smaller changes in state there is very little intervention in the transmission process, and once again fewer disturbances due to this intervention in the transmission process can therefore be expected.

In a further advantageous embodiment of the invention, transmission of the color signal is additionally detected at recognizable color signal edges. The result is that disturbing color fringes at color boundaries that are not characterized by a luminance discontinuity, and disturbing jitters at these color boundaries are substantially reduced, so they are no longer noticeable. In this connection it may be advantageous for color fringe suppression by means of color boundary detection to be activated only if a luminance boundary is not also detected at the location of the color boundary with the disturbing color fringe. Another advantageous feature—the result of including color boundary detection in the elimination of a disturbing color fringe at that same color boundary—consists in superimposing a certain portion of the output signal of the color boundary detection system on the output signal of the system for detecting the associated luminance boundary. As a result, color boundary interference suppression is adapted to the interference variables causing this interference.

BRIEF DESCRIPTION OF THE INVENTION

The invention will be explained in more detail below with reference to advantageous exemplary embodiments. These exemplary embodiments show non-exhaustive examples of advantageous embodiments and developments of the invention, but the invention is not limited to the exemplary embodiments depicted. In the drawings.

BEST MODE FOR CARRYING OUT THE INVENTION

Figure 1:
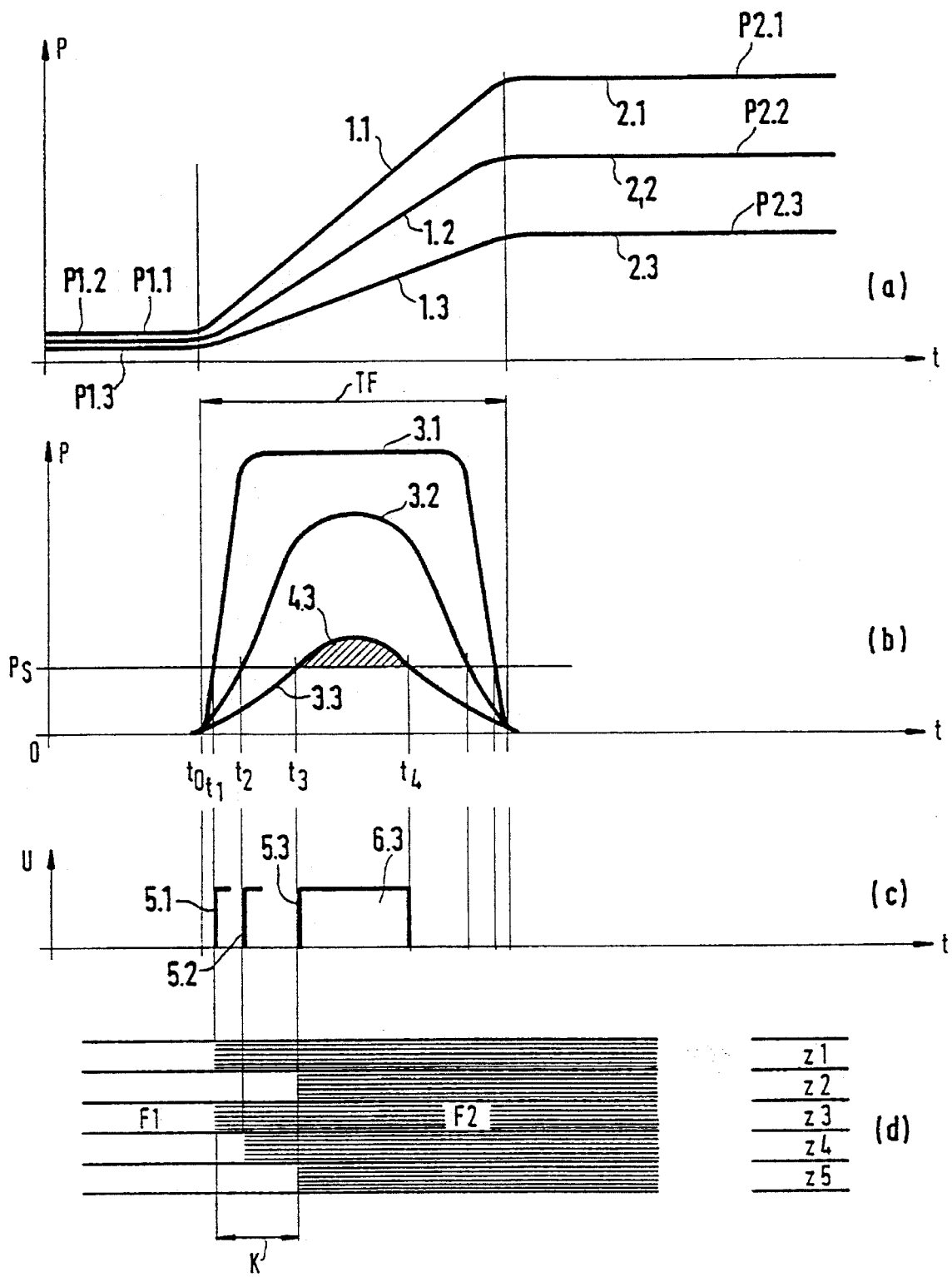
FIG. 1 shows, in diagrams (a) to (d), various signal edges of a detected color boundary, and signals derived therefrom to suppress interference at the color boundary in accordance with the prior art.
Figure 2:
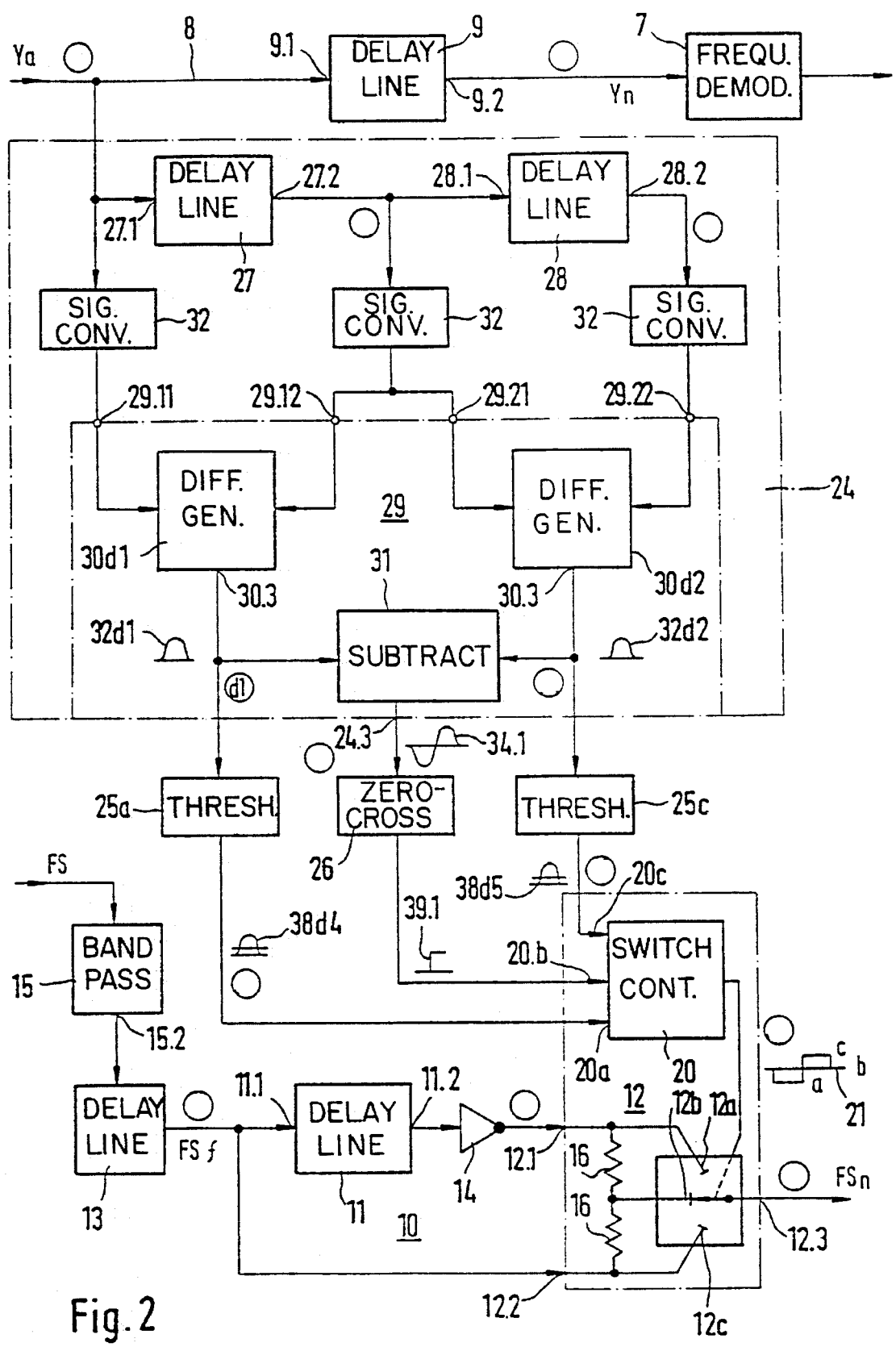
FIG. 2 shows a block circuit diagram of a first video signal transmission arrangement with a color fringe suppression system.

FIG. 2 shows, in a block circuit diagram, an exemplary embodiment of an arrangement for transmitting color television signals for reproduction of a color television image on a screen (not depicted further). In the exemplary embodiment depicted, the transmission arrangement is arranged, for example, before the frequency demodulator 7 in the reproduction portion of a video recorder (not depicted further). To transmit a color television signal, the transmission arrangement contains a transmission path 8 with a delay line 9 to transmit the frequency-modulated luminance signal Ya of the color television signal, and a transmission path 10 with a delay line 11, a signal switcher 12, and an additional delay line 13 to transmit the color signal FSf of the color television signal. The transmission path 10 for the color signal is connected to the output 15.2 of a bandpass 15 that is tuned to the color carrier frequency f(FT). The signal switcher 12 contains three switch positions 12a, 12b, and 12c, of which the center switch position 12b is connected via two identical ohmic resistors 16 to the two outer switch positions 12a and 12c.

The first signal input 12.1 of the signal switcher 12, connected to the outer switch position 12a, is connected to the output 11.2 of the delay line 11 in the transmission path 10 of the color signal, and the second signal input 12.2, connected to the second outer switch position 12c of the signal switcher, is connected to the input 11.1 of that same delay line 11. The signal switcher 12 also contains a switch controller 20 that generates a setting signal 21 to set the signal switcher to switch position 12a, 12b, or 12c.

Inserted between the input 9.1 of the delay line 9 in the transmission path 8 of the luminance signal and the setting inputs 20a to 20c of the switch controller 20 is an edge detector arrangement 24 along with two threshold value switches 25a and 25c and a zero crossing detector 26. The edge detector arrangement 24 consists essentially of the series circuit comprising two delay lines 27 and 28—of which the input 27.1 of the first delay line 27 of the series circuit is connected to the input 9.1 of the delay line 9 in the transmission path 8 of the luminance signal Ya—and a signal processing circuit 29 with two signal difference generators 30d1 and 30d2 and a subtractor 31. The difference inputs of the first signal difference generator 30d1 constitute the first difference input pair 29.11 and 29.12 of the signal processing circuit 29, and the difference inputs of the second signal difference generator 30d2 constitute the second difference input pair 29.21 and 29.22 of the signal processing circuit. These difference inputs are connected via signal converters 32 to the inputs 27.1 and 28.1 and the outputs 27.2 and 28.2 of the two serially connected delay lines 27 and 28 of the edge detector arrangement 24 in such a way that the first signal difference generator 30d1 is arranged along the first delay line 27, and the second signal difference generator 30d2 along the second delay line 28. The purpose of the signal converters 32 is to convert the signal applied to the inputs and outputs of the delay lines 27 and 28 into an output signal, equivalent to the input signal, which is such that the signal difference generators 30d1 and 30d2 form, from the signal value, a difference value corresponding to the difference between the input signals, and generate at their signal output 30.3 a difference signal 32d1 and 32d2 corresponding to that same difference value.

The mode of operation of the color fringe suppression system of the transmission arrangement depicted as an example in FIG. 2 will be explained in more detail with reference to the diagrams of FIG. 3. The designations (a) to (n1) of the diagrams in FIG. 3 are selected so as to match the designations of the corresponding diagrams of the subsequent exemplary embodiments of the invention.

In the exemplary embodiment depicted, the delay time Tv11 of the delay line 11 in the transmission path 10 of the color signal FSf is calculated so that it is exactly an odd whole multiple of half the oscillation time T(FT) of the color carrier, minus the operating time of the inverter 14—which, in the exemplary embodiment depicted, is downstream from that same delay line 11—and is only slightly greater than the longest expected edge duration T(SF) of the signal edge of the color signal which causes the disturbing color fringe. The "edge duration" is understood to mean the duration of the time domain of a signal edge that causes the visually disturbing color fringe. The result of this feature is that no phase errors occur when the signal switcher 12 switches over, and with the signal switcher in the center switch position 12b, the undelayed color signal FSf and the delayed color signal FSg are conveyed with identical phase to the output 12.3 of the signal switcher 12, thus preventing phase errors in the transmission of the color signal.

Diagram (a) shows schematically a portion of the undelayed luminance signal Ya at the input 9.1 of the delay line 9 in the transmission path 8 of that same signal and at the input 27.1 of the first delay line 27 of the edge detector arrangement 24; diagram (b) the luminance signal Yb, singly delayed by that same delay line, at the output 27.2 of that same delay line; and diagram (c) the luminance signal Yc delayed once again by the second delay line 28 of the edge detector arrangement 24. The undelayed luminance signal Ya contains, at time t0, a luminance discontinuity SYa3 at which the luminance signal jumps, in a steeply rising signal edge Ya3, from a first signal state Ya1 representing a first luminance value to a second signal state Ya2 representing a second luminance value, and at time t5 a second, smaller luminance discontinuity SYa4, at which the luminance signal Ya changes, via a second signal edge Ya4, from the second signal state Ya2 to a third signal state Ya5 representing a third luminance value. The singly delayed luminance signal Yb is correspondingly shaped at points t1 and t7, and the doubly delayed luminance signal Yc at points in time t4 and t9. The first signal difference generator 30d1 forms at its output 30.3, from the difference between the undelayed luminance signal Ya and the delayed luminance signal Yb between the luminance discontinuity SYa3 of the undelayed luminance signal Ya and the luminance discontinuity SYb3 of the singly delayed luminance signal Yb, a signal difference signal 32d1 that is the representation of the signal difference between the signal Ya at the input 27.1 and the singly delayed luminance signal Yb at the output 27.2 of the first delay line 27 of the edge detector arrangement 24. In the same manner, the second signal difference generator 28 forms at its output 30.3, from the difference between the luminance discontinuity SYb3 of the singly delayed luminance signal Yb and the luminance discontinuity SYc3 of the doubly delayed luminance signal Yc at the output 28.2 of the second delay line 28 of the edge detector arrangement 24, a second signal difference signal 32d2. The two signal difference signals 32d1 and 32d2 generated by the signal difference generators 30d1 and 30d2 are depicted in diagrams (d1) and (d2) of FIG. 3, along with the two signal difference signals 32d1.1 and 32d2.1 formed between the luminance discontinuities SYa4 and SYb4 of the undelayed and singly delayed luminance signals on the one hand, and the luminance discontinuities SYb4 and SYc4 of the singly delayed and doubly delayed luminance signals on the other hand. The signal difference generators 30d1 and 30d2 are such that they output the signal difference signals formed by them at their signal output 30.3 in only one polarity direction (in the exemplary embodiment depicted, only in the electrically positive polarity direction). Because of the way in which the two signal difference signals 32d1 and 32d2 are generated, these two signals overlap in time in the region 33 of the edge rise time T(FSL3). The subtractor 31 subtracts the two identical signals, producing at its signal output, which represents the detection output 24.3 of the edge detection arrangement 24 depicted in FIG. 2, an edge difference signal 34.1 and, in the region of the second luminance discontinuity SYb4 of the delayed luminance signal Yb, a second edge difference signal 34.2, both of which are depicted in diagram (d) of FIG. 3. The two edge difference signals 34.1 and 34.2 oscillate—with a first oscillation 34a oriented negatively in the exemplary embodiment depicted and a second oscillation 34b subsequent thereto and oriented positively in the exemplary embodiment depicted—about a zero line 35, and pass through the zero line at the center t2 of the overlap region 33 of the two signal difference signals 32d1 and 32d2 with a zero crossing 36. This zero crossing is located on the one hand at the steepest point of the edge-difference signal 34.1, and on the other hand temporally at the center of the signal edge of the luminance discontinuity SYb3 of the singly delayed luminance signal Yb, and thus defines the detection time t2 of the luminance discontinuity SYb3 of the delayed luminance signal at the output 27.2 of the first delay line 27 of the edge detection arrangement 24.

Figure 3:
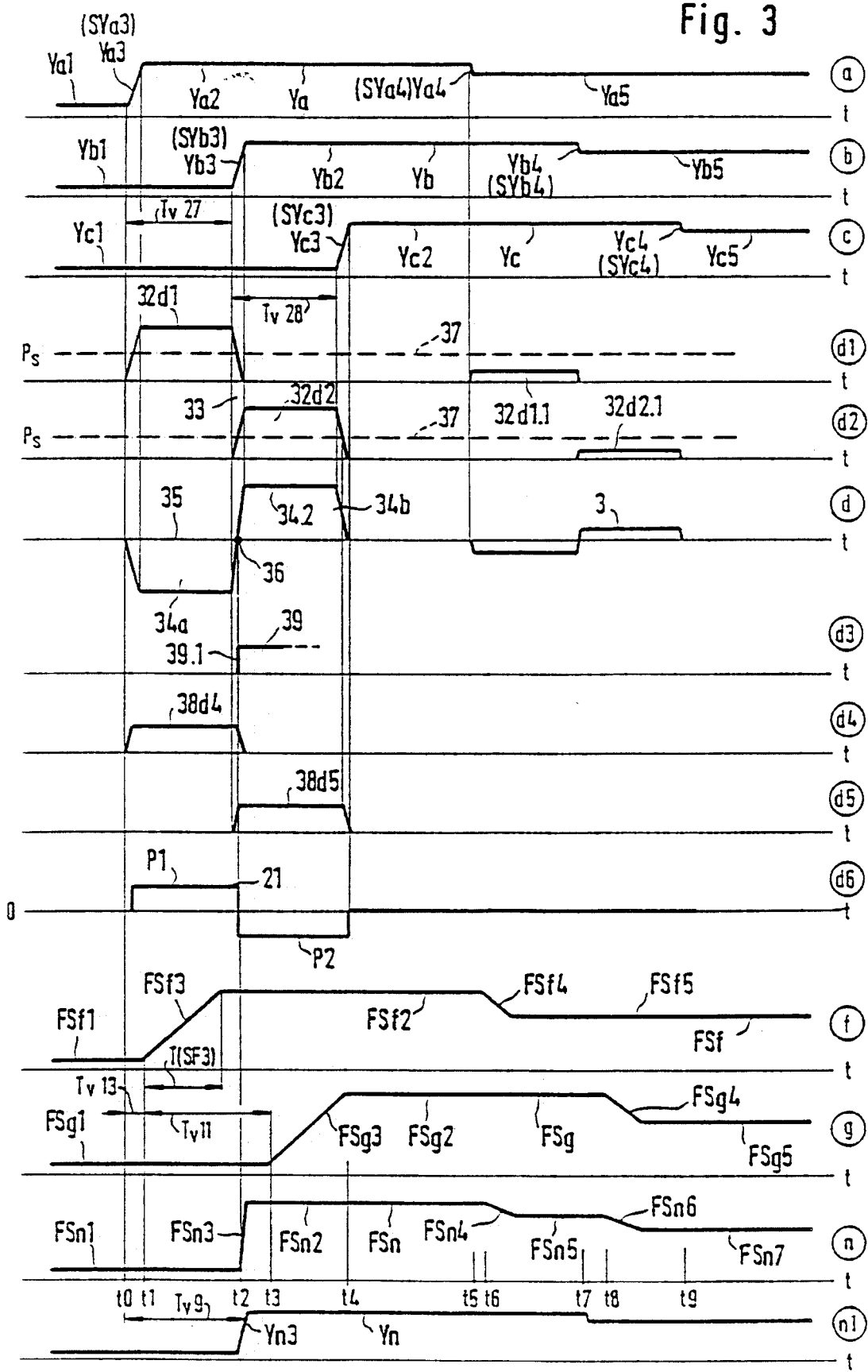
FIG. 3 shows diagrams (a) to (n1) of signals concerning the operating sequence of the arrangement depicted in FIG. 2.

In the exemplary embodiment depicted in FIG. 2, there is connected to each signal output 30.3 of the signal difference generators 30d1 and 30d2 a threshold value switch 25a and 25c, respectively, the switching level Ps of which is represented in diagrams (d1) and (d2) of FIG. 3 by a dashed line 37. If the level of the signal difference signals 32d1 and 32d2 exceeds the switching level Ps of the threshold value switches represented by the line 37, the latter generate at their output 25.1, during the time the level is exceeded, a switching signal 38d4 and 38d5 that is depicted schematically in diagrams (d4) and (d5) of FIG. 3. The zero crossing detector 26 at the output of the subtractor 31 generates, at the zero crossing 36 of the edge difference signal 34.1 conveyed to it, a switching edge 39.1 of a switching signal 39, which together with the switching edge 39.1 is depicted schematically in diagram (d3) of FIG. 3. From these three switching signals 38d1, 38d2, and 39, the switch controller 20 of the signal switcher 12 generates a setting signal 21 that is depicted in diagram (d6) of FIG. 3, and that in the exemplary embodiment depicted has a first setting level P1 during the switching signal. 38d4 of the first signal difference generator 30d1 and a second setting level P2 during the switching signal 38d5 of the second signal difference generator 30d2, and at the switching edge 39.1 of the switching signal 39 of the zero crossing detector 26 jumps from the first setting level P1 to the second setting level P2 and outside these two switching signals 38d4 and 38d5 has the setting level 0, at which the signal switcher is set to the center switching position 12b. The first setting level P1 sets the signal switcher 12 to the first outer switch setting 12a, in which the output 12.3 of the signal switcher is connected to the output of the delay line 11 of the transmission path 10 for the color signal. The second setting level P2 sets the signal switcher 12 to the second switch position 12c, in which the output 12.3 of the signal switcher is connected to the input of that same delay line 11.

The luminance discontinuity SYa4 between the signal state Ya2 and Ya5 of the undelayed luminance signal Ya and the delayed luminance signals Yb and Yc is so small that the level of the signal difference signals 32d1.1 and 32d2.1 generated therefrom in the edge detector arrangement 24 does not reach the switching level Ps of the threshold value switches 25a and 25c, and thus no switching signals are generated at the output of the threshold value switches 25a and 25c. As a result, the edge difference signal 34.2 generated at the output of the subtractor 31 from the signal difference signals 32d1.1 and 32d2.1 also does not act on the switch controller 20 of the signal switcher 12.

Diagram (f) of FIG. 3 depicts a portion of the undelayed color signal FSf, related to the undelayed luminance signal Ya, which is applied to the second signal input 12.2 of the signal switcher 12, while diagram (g) depicts a portion of the color signal FSg delayed by the delay line 11 and applied to the first signal input 12.1 of the signal switcher 12. The undelayed color signal FSf has a first signal edge FSf3 at which the color signal changes, in an edge rise time T(SF3), from a signal state FSf1 representing a first chroma F1 to a signal state FSf2 representing a second chroma F2, and which is related to the first signal edge Ya3 of the luminance signal Ya depicted in diagram (a); and a second signal edge FSf4 at which the color signal FSf changes from the signal state FSf2 to a signal state FSf5 representing the chroma F3, which belongs to the signal edge Ya4 of the luminance signal Ya at the point t6. The curve of the delayed color signal FSg, depicted in diagram (g) and offset by the delay time Tv11 with respect to the undelayed color signal FSf, is of corresponding shape. The rise time T(SF3) of the signal edge FSf3 is greater by a substantial factor than the rise time T(SFL3) of the associated signal edge Ya3 of the undelayed luminance signal Ya. These signal edges, extending over a large chroma region, of sequential lines of a color image transmitted by the color television signal generate a disturbing color fringe along a color boundary depicted in the color image.

In general, the signal edge Ya3 of the undelayed luminance signal Ya is adjusted in time, with respect to the related signal edge FSf3 of the undelayed color signal FSf, in such a way that the center of the signal edge of the luminance signal lies temporally at the center of the related signal edge of the undelayed color signal. The delay time Tv13 of the delay line 13 at the output 15.2 of the bandpass 15 is calculated so that the signal edge FSf3 of the undelayed color signal FSf is delayed in time to the extent that the end of the longest expected rise time T(SF3) is located immediately before the zero crossing 36 at the time t2 of the edge difference signal 34.1 generated by the edge detection arrangement 24. On the other hand, the delay time Tv27 of the first delay line 27 of the edge detection arrangement 24 is longer than the longest expected rise time T(SF3) of a color boundary of the color signal FSf, so that the oscillation 34a located before the zero crossing 36 is always wider in time than the disturbing color fringe.

Diagram (n) schematically depicts the curve for the transmitted color signal FSn at the signal output 12.3 of the signal switcher 12. Because the signal switcher is set by the switching signal 21, before the beginning of the signal edge FSf3 of the undelayed color signal FSf, to its first outer switch setting 12a, the signal output 12.3 of the signal switcher 12 is connected to the output of the delay line 11 in the transmission path of the color signal, and transmits the first signal state FSg1 of the delayed color signal FSg (which represents the first chroma F1) until, at the time t2 of the zero crossing 36 of the edge difference signal 34.1 at the output 24.3 of the edge detection arrangement 24, the setting level of the setting signal 21 of the switch controller 20 changes from level value P1 to the second level value P2 and thereby switches the signal switcher 12 to the second outer switch position 12c. As a result, the state of the color signal FSn transmitted at the signal output 12.3 of the signal switcher changes, at the same switching velocity as the signal switcher 12, from the first signal state FSn1 representing the first chroma F1 to the second signal state FSn2 representing the second chroma F2, with a very steep signal edge FSn3. At the end of the setting signal 21, the signal switcher 12 is set back to its center switch position 12b, in which it remains until a subsequent setting signal arrives. Since, in this center switch position of the signal switcher 12, both the undelayed color signal FSf and the delayed color signal FSg have the same effect on the color signal FSn at the output 12.3 of the signal switcher 12, a signal edge occurs in attenuated form in the color signal FSn at the signal output of the signal switcher, both in the region of the second signal edge FSn4 of the undelayed color signal FSf, and in the time region of the second signal edge FSg4 of the delayed color signal FSg. However, the color changes at these two color boundaries FSn4 and FSn6 are generally so slight that they are not perceptible. The disturbing signal edge FSf3 of the color signal, however, which generates a color fringe, is steepened by the transmission switchover at the signal switcher 12 so as to form a sharp color boundary, without a color fringe, on the reproduced color image.

The delay time Tv9 of the delay line 9 in the transmission path 8 of the luminance signal Yn is calculated so that the associated luminance boundary Yn3 is located temporally at the point of the steepened color boundary FSn3, as depicted schematically in diagram (n1) of FIG. 3.

Figure 4A:
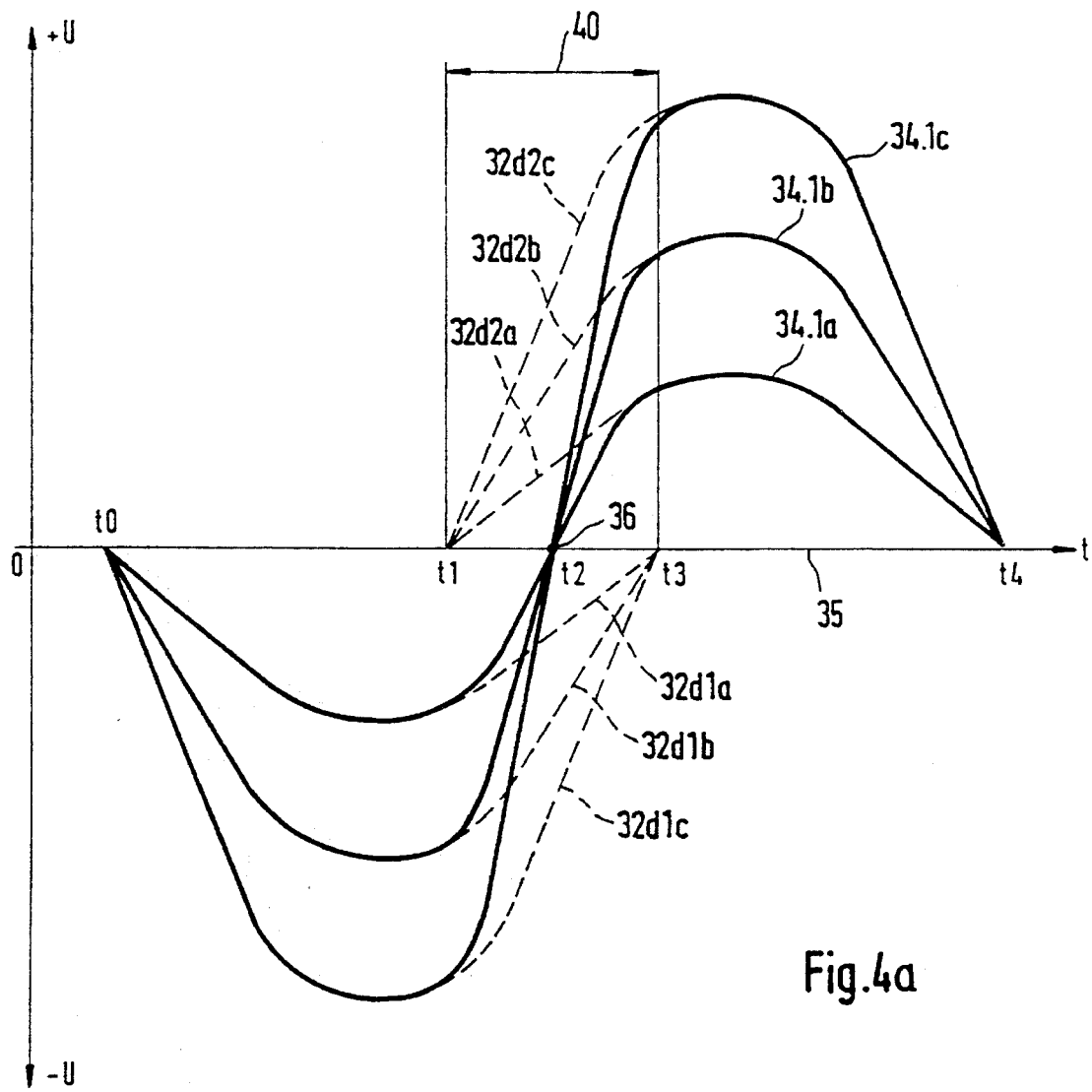
FIG. 4 shows a schematic depiction of various detection signals of an arrangement in accordance with the invention, with a zero crossing at the detection point and a portion of a color boundary produced therefrom.
Figure 4B:

Switchover of the signal switcher 12 from the first outer switch setting 12a to the second outer switch setting 12c, and thus the color discontinuity of the color signal at the signal output 12.3 of the signal switcher 12 from the signal state FSn1 to the signal state FSn2, always occur at the time t2 of the zero crossing 36 of the associated edge difference signal 34.1 at the output 29.3 of the edge detector arrangement 24. This zero crossing is independent of the shape of the signal difference signals 32d1 and 32d2 formed in the signal difference generators, as depicted schematically in diagram (a) of FIG. 4, which depicts three different signal difference signal pairs 32d1a to 32d2c, and the edge difference signals 34.1a to 34.1c formed from them in the subtractor 31. Because the luminance edges Ya3 of the luminance signals Ya are located at the same point in the individual lines of the color television image, and the two signal difference signals, for example 31d1a and 31d2a, of a signal difference signal pair have the same amplitude and curve shape, the center of the overlap region of a signal difference signal pair, e.g. 32d1a and 32d2a, is always located at the same point in time t2 of an image line, and the zero crossing 36 of each edge difference signal 34.1a to 34.1c formed from the signal difference signal pairs is also located at the center of the overlap region 40 of the two signal difference signals of the associated signal difference signal pair, and thus, regardless of the shape and amplitude of the edge difference signals of a color boundary, at the same point in time t2. It is evident from this that the detection time of the signal edges of a luminance edge related to a color boundary is independent of the shape and amplitude of the signal difference signals detected in connection therewith, and the switchover time for the color signals controlled on that basis by the signal switcher in the transmission path 10 of the color signal is independent of the shape and amplitude of the signal difference signals detected in the edge detection arrangement 24, so that the color boundary is also largely free of jitters, as depicted schematically in diagram (b) of FIG. 4. This schematically depicts several image lines z1 to z5 with a color discontinuity between a first chroma F1 and a second chroma F2.

Figure 5:
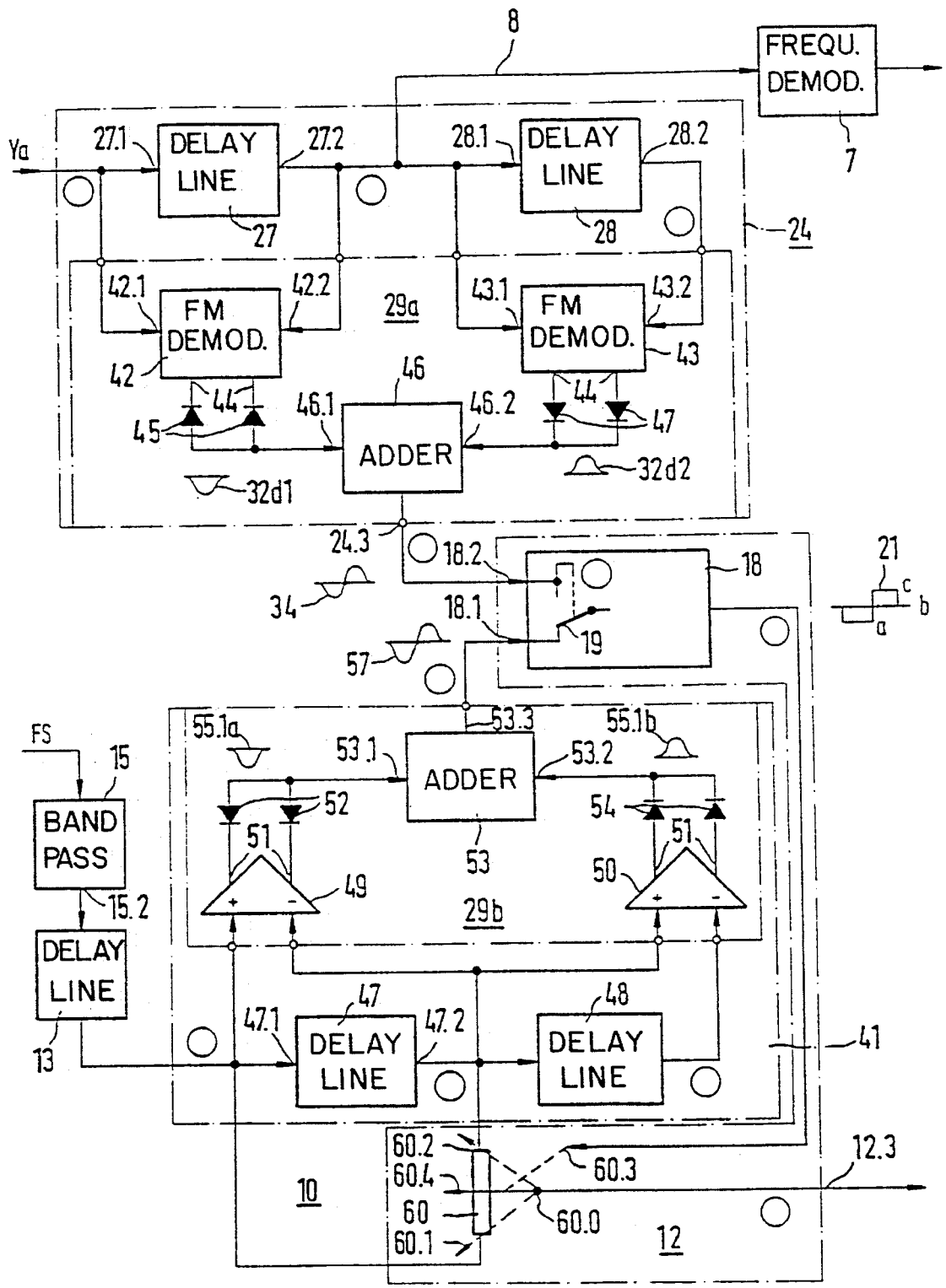
FIG. 5 shows a block circuit diagram of a second exemplary embodiment of the invention, with a detection system both for the color boundary and for the associated luminance boundary.

The exemplary embodiment depicted in FIG. 5 of an arrangement for transmitting color television signals and for eliminating a disturbing color fringe along a color boundary, especially a vertical one, contains, in contrast to the exemplary embodiment depicted in FIG. 2, along with an edge detection arrangement 24 for detecting signal edges in the luminance signal of the color television signal, additionally a color signal edge detection arrangement 41. Moreover the first delay line 27 of the edge detection arrangement 24 for detecting luminance edges is simultaneously the delay line in the transmission path 8 for the luminance signal Ya. A portion of the undelayed luminance signal Ya is depicted schematically in diagram (a) of FIG. 6, a corresponding portion of the luminance signal Yb delayed by the delay line 27 in diagram (b), and a corresponding portion of the luminance signal Yc delayed in the second delay line 28 of the edge detector arrangement 24 in diagram (c). In the exemplary embodiment depicted, the luminance signal Ya is again present as an FM signal, for example as a signal from the IF region of a color television receiver. FM demodulators 42 and 43, with one non-inverted and one inverted signal output 44, serve as signal difference generators. The oppositely polarized signal outputs 44 of the first FM demodulator 42, the two signal inputs 42.1 and 42.2 of which are connected to the input 27.1 and the output 27.2 of the first delay line 27 of the edge detector arrangement 24, are connected via rectifiers 45 of a specific identical polarity to the signal input 46.1 of a signal adder 46, and the oppositely polarized signal outputs 44 of the second FM demodulator 43, the signal inputs 43.1 and 43.2 of which are connected to the input 28.1 and the output 28.2 of the second delay line 28 of the edge detector arrangement 24, are connected, via rectifiers 47 whose polarity is opposite to the polarity of the output-side rectifiers 45 of the first FM demodulator 42, to the second signal input 46.2 of the signal adder 46. By means of these features, signal difference signals 32d1 and 32d2 of opposite polarity are conveyed to the signal inputs 46.1 and 46.2 of the signal adder 46, so that signal addition inside the signal adder 46 corresponds to a subtraction of the signal difference signals supplied by the FM demodulators 42 and 43. The signal output 46.3 of the signal adder 46, which is simultaneously the detection output 24.3 of the edge detection arrangement 24, supplies edge difference signals 34.1 and 34.2 generated by signal addition, each of which is depicted schematically in diagram (d) of FIG. 6, and in the exemplary embodiment depicted, oscillates about a zero line 35 of the edge difference signal with a zero crossing 36; in the exemplary embodiment depicted, its first oscillation 34a before the zero crossing is always negative, and in the exemplary embodiment depicted, its second oscillation 34b after the zero crossing in time is always positive.

The color signal edge detection arrangement 41 also contains the series circuit comprising a first delay line 47 and a second delay line 48, of which the first delay line 47 is simultaneously arranged to delay the color signal FSf in the transmission path 10 of the color signal. The delay time Tv47 of the first delay line 47 of the color signal edge detection arrangement 41 is, in the exemplary embodiment depicted, an odd whole multiple of half the oscillation period T(FT) of the color carrier, so that the color carrier oscillations at the output 47.2 and at the input 47.1 of the first delay line 47 are identical to one another in phase. Diagram (f) of FIG. 6 contains a portion of the undelayed color signal FSf at the output of the bandpass 15 corresponding to the portion of the luminance signal Ya depicted in diagram (a); diagram (g) the signal portion offset in time by the delay time TV47 of the first delay line 47 and depicted in diagram (f); and diagram (h) the portion of the signal portion of the color signal FSf depicted in diagram (f) and offset in time once again by the delay time of the second delay line 48. The delay time Tv47 of the first delay line 47 is moreover calculated so that it is slightly greater than the longest expected rise time T(FS3) of a signal edge of the color signal FSf. In the exemplary embodiment depicted, differential amplifiers 49 and 50, with one non-inverted and one inverted signal output 51, serve as the signal difference generators of the color signal edge detection arrangement 41. The oppositely polarized signal outputs of the first differential amplifier 49 are connected via rectifiers 52 of a specific identical polarity to the first signal input 53.1 of a signal adder 53, and the oppositely polarized signal outputs 51 of the second differential amplifier 50 are connected, via rectifiers 54 with a polarity opposite to that of the first rectifiers, to the second signal input 53.2 of the signal adder. The differential amplifiers 49 and 50 in turn supply, in conjunction with their output-side rectifiers 52 and 54, pairs of signal difference signals 55.1a and 55.1b, which are depicted in diagram (i) of FIG. 6 and of which again the first signal difference signal 55.1a has a negative polarity and the second signal difference signal 55.1b has a positive polarity. By addition of these two signals, the signal adder 53 forms the associated edge difference signal 57.1 which oscillates about a zero line 35 and passes through it at a zero crossing 36, as depicted in diagram (i).

Figure 6:
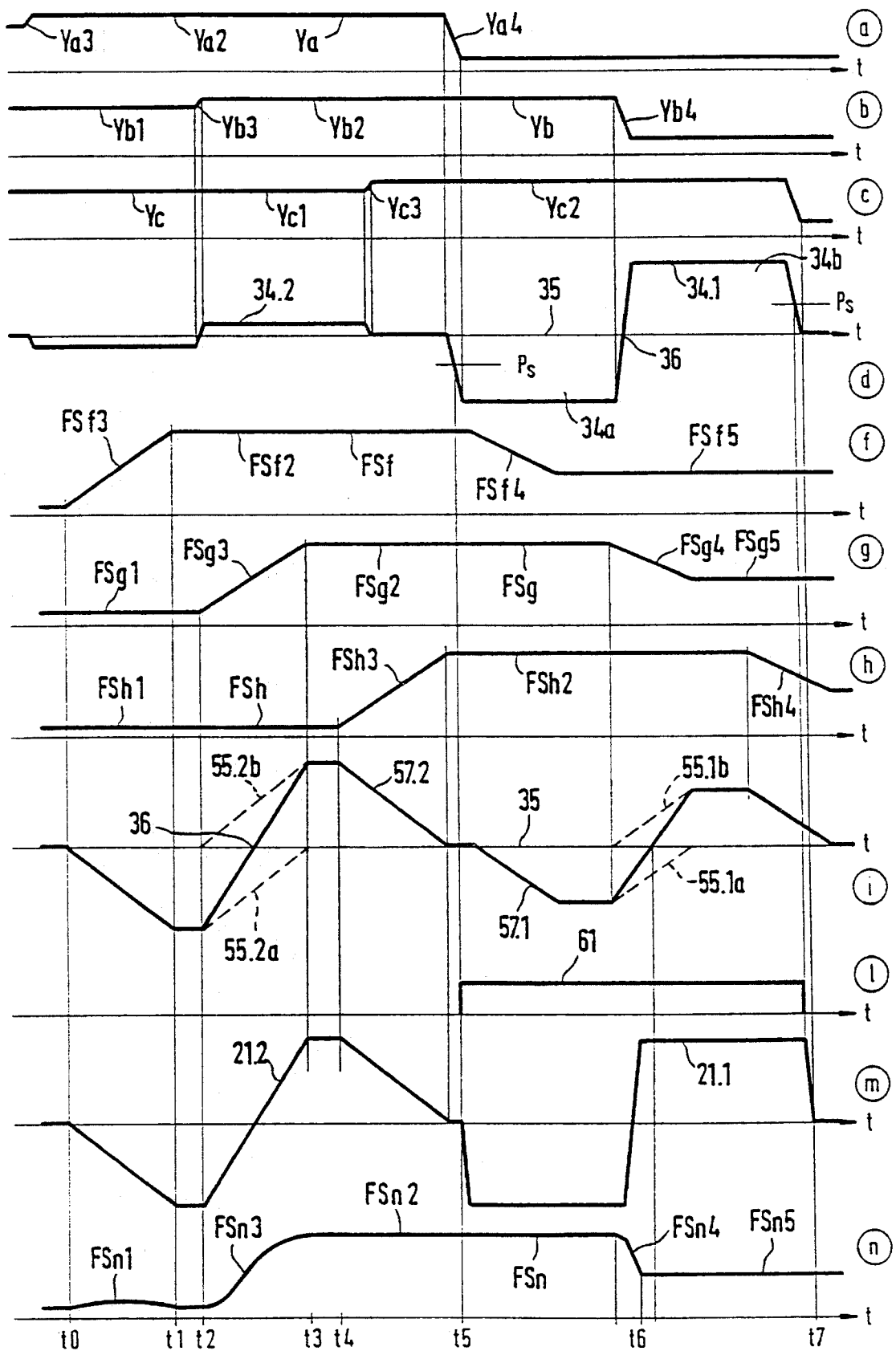
FIG. 6 shows diagrams (a) to (n) of signals concerning the operating sequence of the arrangement depicted in FIG. 5.

In the exemplary embodiment depicted in FIG. 6, the signal switcher 12 contains as the setting device an electronic crossfade potentiometer 60, the tap 60.0 of which is connected to the signal output 12.3 of the signal switcher, and the signal inputs 60.1 and 60.2 of which connect the ends of the tappable resistance of the electronic crossfade potentiometer 60 to the input 47.1 and the output 47.2 of the first delay line 47 of the color signal edge detection arrangement 41. The signal switcher 12 also contains a regulator controller 18 with a priority switch 19 that connects the first input 18.1 of the regulator controller 18 to the signal output 53.3 of the signal adder 53 of the color signal edge detection arrangement 41 as long as an edge difference signal 34.2 does not reach and exceed a specific switching level Ps that is indicated in diagram (d). Otherwise the second input 18.2 of the regulator controller 18 is connected, for the duration of the edge difference signal 34.1 of the edge detector arrangement 24 for detecting luminance signal edges, to its detection output 24.3.

In the signal profile of a color television signal depicted in FIG. 6, two color boundaries are transmitted. In the case of the first color boundary, a large color signal discontinuity FSf3 is associated with a small luminance signal discontinuity SYa3. The result is to generate in the edge detection arrangement 24, at the luminance signal edges Ya3, Yb3, and Yc3, an edge difference signal 34.2 whose signal level remains considerably below the switching level Ps for the priority switch 19, so that the priority switch in the regulator controller 18 is not switched over. As a result, the edge difference signal 57.2 generated in the color signal edge detection arrangement 41 arrives as the setting signal 21.2 at the setting input 60.3 of the electronic crossfade potentiometer 60, as depicted in diagram (m). As a result, the wiper 60.4 of the electronic crossfade potentiometer is first moved out of the center position towards the second signal input 60.2 of the electronic potentiometer, to which the color signal depicted in diagram (g) and delayed by the first delay line 47 is conveyed, as a result of which the first signal state FSg1 representing a first chroma F1 is approximately maintained, and then, during the rise time of the signal edge FSg3 of the delayed color signal FSg, is set to the other setting of the electronic potentiometer 60 connected to the first signal input 60.1. In this adjustment procedure between time t2 and time t3, the color signal FSn depicted in diagram (n) reaches, in a relatively rapid rise FSn3, the signal state FSn2 representing a second chroma F2, because of the predominantly increasing proportion of that signal state.

The second luminance signal edge Ya4 of the undelayed luminance signal Ya at the second color boundary is such that the edge detection signal 34.1 for detection of this same luminance edge Ya4, generated in the edge detection arrangement 24, exceeds the switching level Ps in the regulator controller 18 and switches the priority switch 19 of the regulator controller to the detection output 24.3 of the edge detection arrangement 24 for detecting a luminance edge for the duration of the edge difference signal at the detection output 24.3, as represented in diagram (1) by the priority signal 61. As a result, from time t5 to time t7 the edge difference signal 34.1 of the edge detector arrangement 24 acts as the setting signal 22.1 for the electronic crossfade potentiometer 60. Correspondingly, the tap 60.4 of the potentiometer is initially moved into the end position connected to the second signal input 60.2 for the delayed color signal FSg, and, at the zero crossing time 36 of the edge difference signal 34.1, is moved, at the same velocity as the zero crossing, from the said end position into the other end position connected to the first signal input 60.1, to which the undelayed color signal FSf is conveyed. The result is to produce at the signal output 12.3 of the signal switcher 12 a very steep signal edge FSn4 between the signal state FSn2 representing the second chroma F2 and the third signal state FSn5, representing the third chroma F3, of the color signal FSn output at the signal output 12.3 of the signal switcher 12, as schematically depicted in diagram (n). As long as neither or the edge detector arrangements 24 or 41 generates an edge difference signal at its detection output, the electronic crossfade potentiometer 60 is set in a center position in which approximately equal portions of the undelayed color signal FSf and of the delayed color signal FSg arrive, superimposed, at the output of the transmission path 10 for the color signal. This superimposition reduces area noise in the color image depiction without falsifying the color image depiction as such. When color changes occur, the electronic crossfade potentiometer 60 is adjusted slidingly and not abruptly, so that it produces no switching disturbances.

Figure 7:
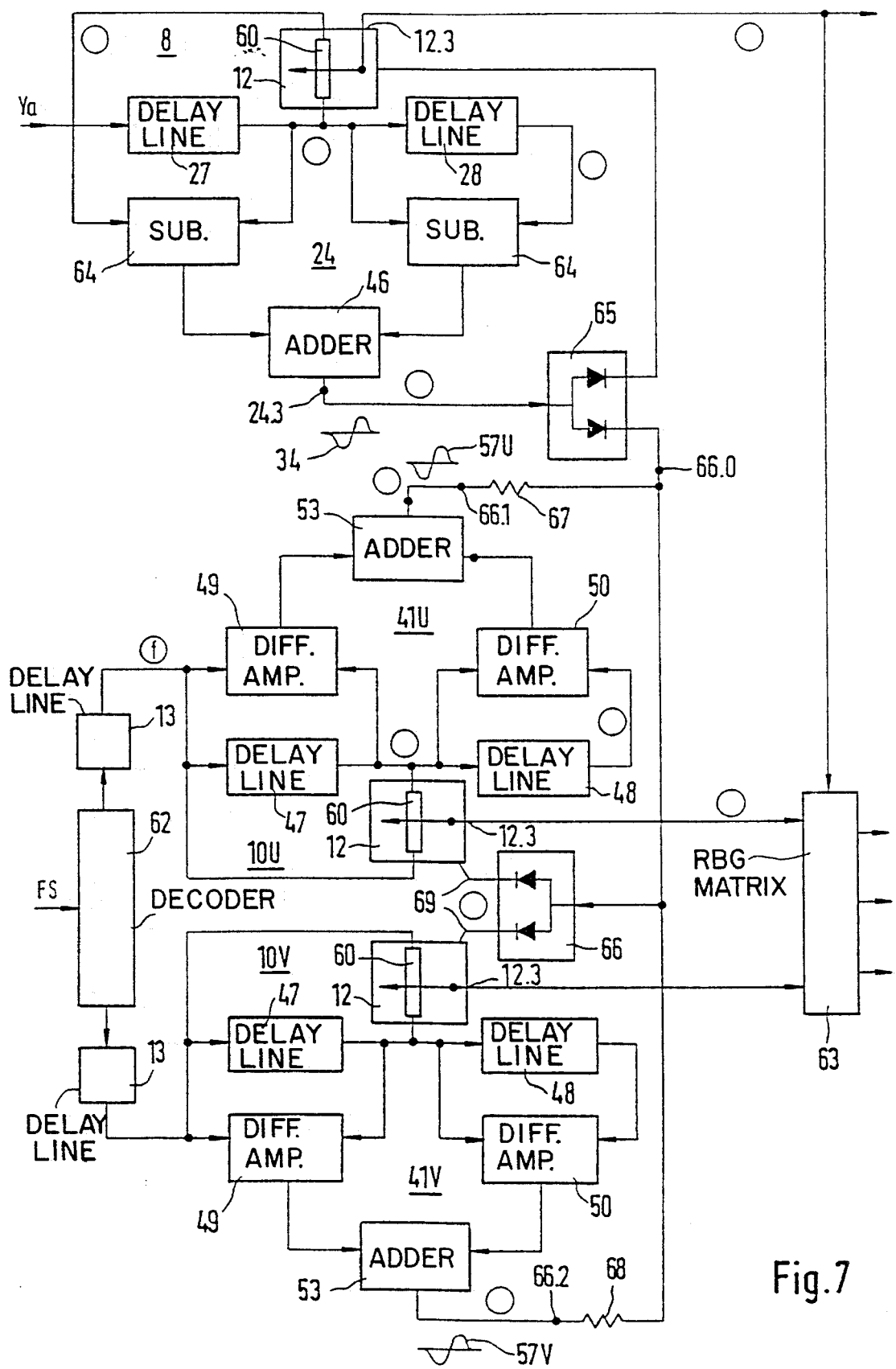
FIG. 7 shows a block circuit diagram of a third exemplary embodiment of an arrangement in accordance with the invention, with two detected transmission paths for two separate color signals of the video signal, and with an electronic crossfade potentiometer in the signal switchers.

The exemplary embodiment of an arrangement, depicted in FIG. 7, for transmitting color television signals and eliminating disturbing color fringes at vertical color boundaries contains a transmission path 8 for transmitting a luminance signal Ya of a color television signal and two identical transmission paths 10U and 10V for transmitting a color signal U and a color signal V. In the exemplary embodiment depicted, these are the transmission paths of the color signals U and V between a color decoder 62 and an RGB matrix 63 of a color television receiver. In addition, an edge-improved luminance signal Ye is conveyed to the RGB matrix. All three transmission paths 8, 10U, and 10V each contain a signal switcher 12, the switching device of which is an electronic crossfade potentiometer 60, corresponding to the exemplary embodiment depicted in FIG. 5. The signal switchers are controlled by the output signal of an edge detection arrangement connected to the transmission path 8 for transmitting the luminance signal. This edge detection arrangement 24 contains, corresponding to the exemplary embodiments depicted previously, two delay lines 27 and 28 wired in series, of which the first delay line 27 is simultaneously the delay line of the transmission path 8 of the luminance signals. Connected along the delay lines 27 and 28, corresponding to the exemplary embodiments depicted previously, are the input sides of subtractors 64, which each form, from the input and output signals of the related delay line, a signal difference signal of opposite polarity in each case, and convey it to an adder 46 to generate an edge difference signal. This edge difference signal 34 is conveyed directly to the signal switchers 12 via decoupling circuit 65 and 66 as the setting signal.

Figure 8:
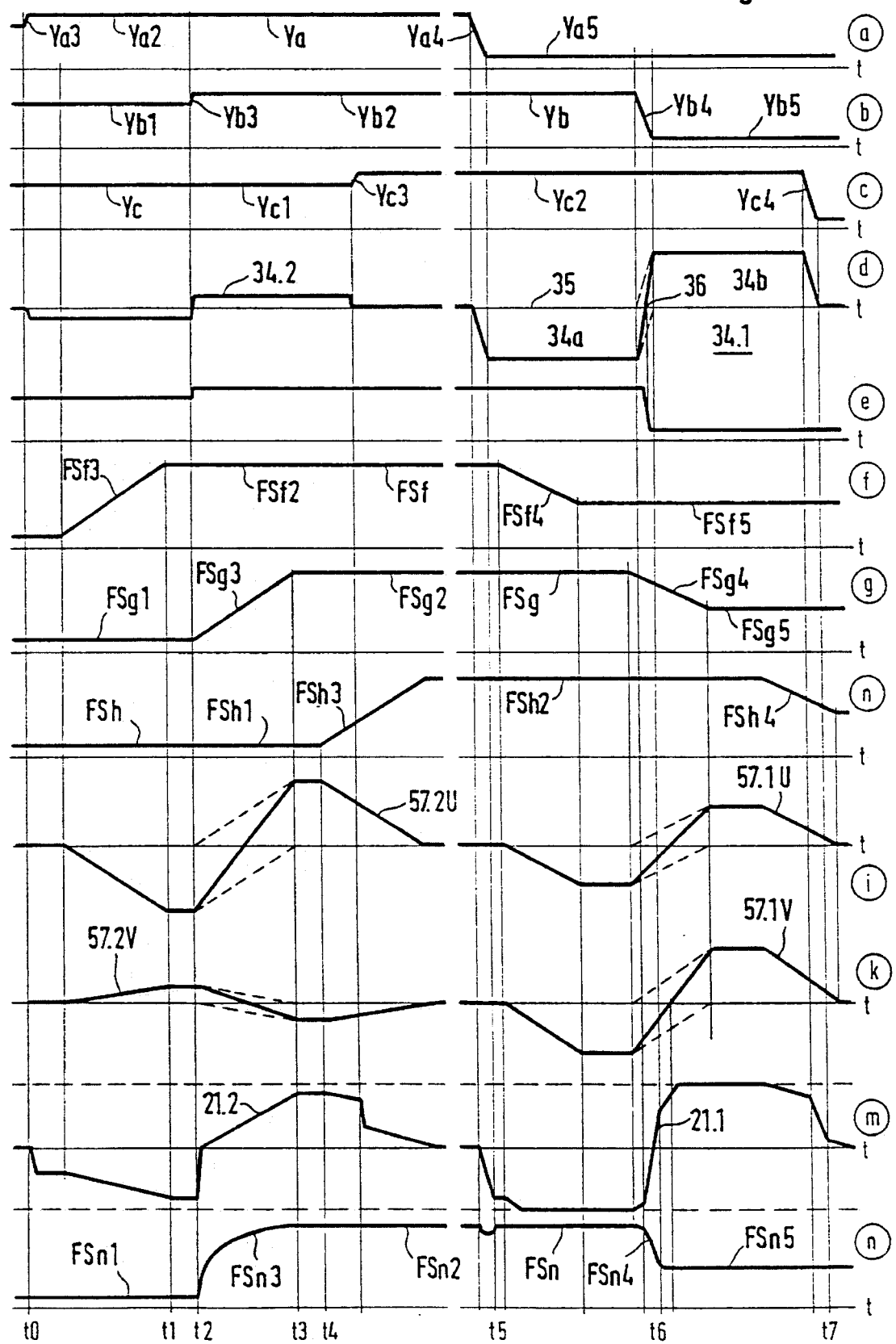
FIG. 8 shows diagrams (a) to (n) of signals concerning the operating sequence of the transmission arrangement depicted in FIG. 7.

In the signal diagrams (a) to (n) depicted in FIG. 8 for the signals generated in the exemplary embodiment in accordance with FIG. 7, the luminance signals depicted in the diagrams (a) to (c) show the same profile as in the diagrams (a) to (c) of FIG. 6, so that the diagrams (d) of the two FIGS. 6 and 8—with the edge difference signal 34, formed from the undelayed and delayed luminance signals Ya, Yb, and Y, depicted therein—also correspond to one another. Also corresponding to one another are the signals depicted in the diagrams (f) to (i) shown with the same names, specifically the undelayed color signal FSf, the two delayed color signals FSh and FSg, and the edge difference signal 57 formed from them, so that no further discussion of these signals is necessary.

In response to the edge detection signal 34, acting as setting signal, which is formed at the output 24.3 of the edge detection arrangement connected to the transmission path 8 of the luminance signal, the signal switcher 12 generates at its signal output 12.3, from the undelayed luminance signal Ya and the delayed luminance signal Yb, a luminance signal Ye whose profile is depicted in diagram (e) of FIG. 8, and which is considerably steepened at the luminance edges, compared with the signal edges of the delayed luminance signal Yb depicted in diagram (b), by the switching velocity of the signal switcher 12 in the transmission path of the luminance signal. This results in considerably sharper image reproduction.

In the exemplary embodiment depicted in FIG. 7, the two transmission paths for color signals U and V contain an edge detection arrangement 41U and 41V, respectively, both of which correspond for example to the detection arrangement of the exemplary embodiment depicted in FIG. 5, and therefore are designated with the same reference numbers.

Diagram (k) of FIG. 8 depicts the curve of the edge difference signals 57.2V and 57.1V for the color signal edges at the corresponding luminance boundaries Yb3 and Yb4 of the delayed luminance signal Yb for the transmission path of the second color signal V. The edge detection signals 57U and 57V depicted in diagrams (i) and (k), with a specific attenuation set by the resistors 67 and 68, are superimposed at the output of the decoupling circuit 65 on the edge difference signal depicted in diagram (d). The decoupling circuit 66 constitutes, together with the resistors 67 and 68, a combination circuit in which the superimposition is produced and at whose signal outputs 69 a setting signal 21 depicted in diagram (m), which sets the electronic crossfade potentiometer 60 of each signal switcher 12 in the transmission paths 10U and 10V of the two color signals U and V, is generated from this superimposition. The color signal FSu formed by adjustment of the electronic crossfade potentiometer 60 of the signal switcher 12 in the transmission path 10U of the first color signal U is depicted schematically in diagram (n). Elimination of a priority switch in the combination circuit 66 to 68 eliminates any switching process in the adjustment circuit for the signal switcher, along with any disturbances in transmission of the luminance and color signals caused by such switching processes.

I claim:

1. A system for transmitting color television signals that contain a luminance signal (Ya) and at least one color signal (FSf) related thereto, with a first delay line (9 or 27) in a first transmission path (8) of the luminance signal for providing a delayed luminance signal and a second delay line (11 or 47U, 47V) in a second transmission path (10) of each color signal each for providing a delayed color signal;

with a signal switcher (12) in the second transmission path (10) of each color signal (FSf), having a first switch terminal, corresponding to a first switch position (12a), which is connected to an output (11.2) of the second delay line (11) and a second switch terminal, corresponding to a second switch position (12c), which is connected to an input (11.1) of the second delay line (11), to switch a signal output (12.3) of the signal switcher from the output (11.2) to the input (11.1) of the second delay line, and vice versa;

and with an edge detector arrangement (24), connected into the first transmission path to detect a signal edge (Ya3) between a first signal state (Ya1), representing a first luminance value, and a second signal state (Ya2), representing a second luminance value, of the luminance signal;

and to switch the signal output (12.3) of the signal switcher from the output of the second delay line to the input of the second delay line at a predefined point in time with respect to a detection time (t2) of a signal edge (Yb3) of the delayed luminance signal (Yb);

characterized in that the edge detector arrangement (24) contains a first edge detector delay line (27) and a second edge detector delay line (28) connected in series, an input (27.1) of the first edge detector delay line (27) is connected to an input of the first transmission path (8)

and a delay time of the first edge detector delay line is greater than a longest edge duration (T(SF3)) of a color signal edge (FSf3) causing a disturbing color fringe, the edge detector arrangement (24) comprises a signal processing circuit (29) having a first difference means (30*d*1) and a second difference means (30*d*2), connected to the input (27.1) of the first edge detector delay line is a first input (29.11) of the first difference means, connected to an output (27.2) of the first edge detector delay line is a second input (29.12) of the first difference means, connected to an input (28.1) of the second edge detector delay line (28) is a first input (29.21) of the second difference means, and connected to an output (28.2) of the second edge detector delay line is a second input (29.22) of the second difference means, the first difference means provides a first signal difference signal (32*d*1) corresponding to the difference (Ya–Yb) between the signal values (Ya, Yb) at the input and output of the first edge detector delay line applied to the first and second inputs (29.11, 29.12) of the first difference means, respectively, and the second difference means provides a second signal difference signal (32*d*2) corresponding to the difference (Yb–Yc) between the signal values (Yb, Yc) at the input and output of the second edge detector delay line applied to the first and second inputs (29,21, 29.22) of the second difference means, respectively, and the edge detection circuit provides an edge difference signal at a detection output (24.3) for controlling the switchover of the signal switcher (12), the edge difference signal (34) is provided by the signal processing circuit as the difference between the first and second signal difference signals, oscillates about a zero line (35), and exhibits a zero crossing (36) at a detection point (12) of the signal edge (Yb3) of the delayed luminance signal (Yb), the signal switcher (12) contains a third switch terminal, corresponding to a third switch position (12*b*), which is connected via ohmic resistors (16) to the first switch terminal (12*a*), and to the second switch terminal (12*c*), the signal switcher being set to the third switch position as long as no edge difference signal is present at the detection output of the edge detection circuit;

and that during oscillation (34*a*) of the edge difference signal (34), provided at the detection output of the edge detection circuit, before the zero crossing (36) of the edge difference signal, the output of the second delay line is connected to the signal output (12.3) of the signal switcher, and during oscillation (34*b*) of the edge difference signal after the zero crossing (36), the input of the second delay line is connected to the signal output (12.3) of the signal switcher.

2. A system according to claim 1 for transmitting color television signals that contain a plurality of color signals (U, V), related to a luminance signal (Ya), and each color signal is transmitted on a color signal transmission path (10U, 10V), characterized in that a color signal delay line (47) is arranged in each color signal transmission path (10U, 10V), and a color signal switcher is located between an input (47.1) and an output (47.2) of each color signal delay line;

and that the color signal switchers (12) of all the color signal transmission paths (10U, 10V) are controlled, simultaneously and jointly, by the edge difference signal (34) of the edge detector arrangement.

3. A system according to claim 1, characterized in that the color signal (FSf) is modulated onto a color carrier oscillation (FT), a delay time (Tv11) of the second delay line (11) is exactly one whole multiple of an oscillation period (T(FT)) of the color carrier oscillation, or an odd whole multiple of half of the oscillation period, and when the delay time is equal to the odd whole multiple of half the oscillation period, an inverter 14 is connected in series with the second delay line.

4. A system according to claim 1, characterized in that the first delay line is also the first edge detector delay line (27).

5. A system according to claim 1, characterized in that the signal switcher (12) comprises a switchover device which is an electronic crossfade potentiometer (60), having a first signal input (12.1) connected to the output (47.2) of the second delay line, and having a second signal input (12.2) connected to the input (47.1) of the second delay line (47), having a setting input (60.3) connected to the detection output (24.3) of the edge detector arrangement (24), the switchover device being set to a center position (60.4) between a first end position (60.1) having a first end terminal connected to the second signal input and a second end position (60.2) having a second end terminal connected to the first signal input when no edge difference signal (34) is being provided to the setting input, and, at a specific level (Ps) of the oscillation (34*a*) of the edge difference signal (34) before the zero crossing (36) of the edge difference signal, the switchover device is set to the second end position, and at the specific level (Ps) of the oscillation (34*b*) of the edge difference signal after its zero crossing, is set to the first end position.

6. A system according to claim 1, characterized in that the oscillation (34*a*) of the edge difference signal (34) before the zero crossing (36) of the edge difference signal always has a first predefined electrical polarity direction, and the oscillation (34*b*) of the color difference signal after the zero crossing always has an electrical polarity opposite to the first predefined electrical polarity.

7. As system according to claim 1, characterized by signal converters (32) connected between the inputs (27.1, 28.1) and outputs (27.2, 28.2) of the first and second edge detector delay lines (27, 28), and the first inputs (29.11, 29.21) and second inputs (29.12, 29.22) of the first and second difference means (30*d*1, 30*d*2), respectively, the signal converters demodulating the signals present at the inputs (27.1, 28.1) and outputs (27.2, 28.2) of the first and second edge detector delay lines (27, 28).

8. A system according to claim 7, characterized in that the signal converter circuits (32) are envelope curve demodulators.

9. A system according to claim 1, characterized in that the first difference means and the second difference means are signal difference generators which provide a first signal difference signal and a second signal difference signal, respectively;

and that a subtractor (31) is connected to outputs of the two signal difference generators for subtracting the first signal difference signal and the second signal difference signal for providing at the detection output (24.3) the edge difference signal (34).

10. A system according to claim 9, characterized in that the two signal difference generators (30d1, 30d2) are differential amplifiers (49, 50) each having one non-inverted output and one inverted output;

and that connected to the outputs (51) of one differential amplifier (49) are first uni-directional current devices (52) oriented in one polarity direction, and connected to the outputs (51) of the other differential amplifier (50) are second uni-directional current devices (54) oriented in the other polarity direction, the first uni-directional current devices are each connected at the output side to a first signal input of a signal adder (53), and the second uni-directional current devices are each connected at the output side to a second signal input of the signal adder, the uni-directional current devices and the adder thereby constituting the subtractor.

11. A system according to claim 9, characterized in that that two signal difference generators (30) are FM demodulators (42, 43) each having one non-inverting output and one inverting output;

and that connected to the outputs (44) of one FM demodulator (42) of the signal processing circuit (29) are first uni-directional current devices (45) oriented in one polarity direction, and connected to the outputs (44) of the other FM demodulator (43) are second uni-directional current devices (47) oriented in the other polarity direction, the first uni-directional current devices are each connected at the output side to a first signal input of a signal adder (46), and the second uni-directional current devices are each connected at the output side to a second signal input of the signal adder, the uni-directional current devices and the adder thereby constituting the subtractor.

12. A system according to claim 1, characterized by an additional color edge detection arrangement (41), connected to the second transmission path (10) at the output of the second delay line, is responsive to the detection of a color signal edge (FSg4) of the color signal (FSg) for generating a color edge difference signal (57.1) that is provided at a color detection output (53.3), oscillates about a zero line (35), and exhibits a zero crossing (36) at a color detection point (16) of the color signal edge (FSg4);

and by a regulator controller (18) with a priority switch circuit (19) for generating a joint control or setting signal (21) for the signal switcher (12) in response to the provision of both the edge difference signal (34.1) and the color edge difference signal (57.1) to signal inputs of the regulator controller.

13. A system according to claim 12, characterized in that the color edge detector arrangement (41) contains a first color edge detector delay line and a second color edge detector delay line connected in series, an input (47.1) of the first color edge detector delay line (47) is connected to the input of the second transmission path (10), and the delay time (Tv47) of at least the first color edge detector delay line is greater than the longest edge duration (T(SF3)) of a color signal edge (FSf3) associated with a color boundary interference band;

the color edge detector arrangement comprises a color signal processing circuit having a first color difference means and a second color difference means, connected to the input (47.1) and an output (47.2) of the first color edge detector delay line (47) are a first and a second input of the first color difference means, respectively, and connected to an input (48.1) and an output (48.2) of the second color edge detector delay line (48) are a first and a second input of the second color difference means, respectively, the first color difference means providing a first color signal difference signal (55.1a) corresponding to the difference between the signal values (FSf, FSg) at the input and output of the first color edge detector delay line applied to the first and second inputs of the first color difference means, and the second color difference means provides a second color difference signal (55.1b) corresponding to the difference between the signal values (FSg, FSh) at the input and output of the second color edge detector delay line applied to the first and second inputs of the second color difference means, and the color edge detection circuit provides a color edge difference signal at a detection output (53.3) for controlling the switchover of the signal switcher (12), the color edge difference signal (57) is provided by the color signal processing circuit as the difference between the first and second color signal difference signals, oscillates about a zero line (35), and exhibits a zero crossing (36) at detection point (t2) of the signal edge (FSg3) of the delayed color signal (FSg).

14. A system according to claim 13, characterized in that the second delay line is also the first color edge detector delay line (47).

15. A system according to claim 12, characterized in that the oscillation (57a) of the color edge difference signal before the zero crossing (36) always has a same, predefined electrical polarity direction, and the oscillation (57b) of the color edge difference signal after the zero crossing always has an electrical polarity direction opposite to the predefined electrical polarity direction.

16. A system according to claim 12, characterized in that in response to the provision of an edge difference signal (34) to one signal input of the regulator controller, another signal input of the regulator controller for the color edge difference signal (57) is blocked.

17. A system according to claim 12, characterized in that the regulator controller (66) signal inputs comprise a first signal input (66.0) for receiving the edge difference signal and signal inputs (66.1, 66.2) for receiving the color edge difference signals, the color edge difference signals (57U, 57V) provided to the second signal inputs are overlain, with an attenuation (67, 68) set in the regulator controller, by the edge difference signal (34) conveyed to the first signal input.

18. A system according to claim 1, characterized by an additional signal switcher (12), arranged in the first transmission path (8) which is responsive to the edge difference signal (34) for being switched into at least three switch positions (12a, 12b, 12c), of which a first switch position (12a) is set during oscillation (34a) of the edge difference signal (34) before the zero crossing (36) of the edge difference signal, whereby a signal output (12.3) of the additional signal switcher (12) is connected to the output (27.2) of the first delay line (27), of which a second switch position (12c) is set during oscillation (34b) of the edge difference signal after the zero crossing of the edge difference signal, whereby the signal output (12.3) of the additional signal switcher is connected to the input (27.1) of the first delay line, and of which a third switch position (12b) is set when no edge difference signal is present, whereby the signal output of the additional signal switcher is connected via ohmic resistors (16) to the output and the input of the first delay line.

19. A system according to claim 18, characterized in that the additional signal switcher (12) comprises a switchover device which is an electronic crossfade potentiometer (60), having a first signal input (12.1) connected to the output (47.2) of the first delay line, and having a second signal input (12.2) connected to the input (27.2) of the first delay line (27), having a setting input (60.3) connected to the detection output (24.3) of the edge detector arrangement (24), the switchover device being set to a center position (60.4) between a first end position having a first end terminal connected to the second signal input and a second end position having a second end terminal connected to the first signal input when no edge difference signal (34) is being provided to the setting input, and, at a specific level (Ps) of the oscillation (34a) of the edge difference signal (34) before the zero crossing (36) of the edge difference signal, the switchover device is set to the second end position, and at the specific level (Ps) of the oscillation (34b) of the edge difference signal after its zero crossing, is set to the first end position.

20. A system according to claim 1, characterized by an additional color delay line (13) in the second transmission path (10), with a delay time (Tv13) calculated such that the beginning of a signal edge (Yb3) of the delayed luminance signal (Yb) is placed immediately around the beginning of the associated color edge signal (FSg3) of the delayed color signal (FSg).

* * * * *

UNITED STATES PATENT AND TRADEMARK OFFICE
CERTIFICATE OF CORRECTION

PATENT NO. : 5,479,216
DATED : December 26, 1995
INVENTOR(S) : Reime

It is certified that error appears in the above-indentified patent and that said Letters Patent is hereby corrected as shown below:

Column 15, claim 1, line 30 "29,21" should be --29.21--

Column 15, claim 1, line 40 "(12)" should be --(t2)--

Column 17, claim 12, line 44 "(16)" should be --(t6)--

Column 18, claim 17, line 45 before "signal" insert --second--

Signed and Sealed this

Sixteenth Day of April, 1996

BRUCE LEHMAN

Attest:

Attesting Officer

Commissioner of Patents and Trademarks